United States Patent [19]

Lowther et al.

[11] Patent Number: 4,654,550

[45] Date of Patent: Mar. 31, 1987

[54] DYNAMOELECTRIC MACHINE WITH AIR GAP BAFFLE ASSEMBLY INCLUDING ECCENTRIC RINGS

[75] Inventors: Gary R. Lowther, Casselberry; Warren W. Jones, Geneva; Donald L. Udavchak, Orlando, all of Fla.

[73] Assignee: Westinghouse Electric Corp., Pittsburgh, Pa.

[21] Appl. No.: 839,488

[22] Filed: Mar. 14, 1986

[51] Int. Cl.$^4$ .............................................. H02K 9/14
[52] U.S. Cl. ........................................ 310/59; 310/42
[58] Field of Search ................... 310/52, 53, 59, 60 R, 310/60 A, 260, 42, 62, 63, 65

[56] References Cited

U.S. PATENT DOCUMENTS

| 3,237,032 | 2/1966 | Vickers et al. | 310/59 |
| 3,413,499 | 11/1968 | Barton | 310/59 |
| 4,585,968 | 4/1986 | Cambrodon | 310/242 |

Primary Examiner—Patrick R. Salce
Assistant Examiner—D. L. Rebsch
Attorney, Agent, or Firm—R. S. Lombard

[57] ABSTRACT

In large dynamoelectric machines such as turbine generators, an air gap baffle assembly has eccentric rings to provide a differential thickness from top to bottom, so that before installation of an inner ring portion of the assembly, the rotor may be installed with greater clearance.

4 Claims, 3 Drawing Figures

DYNAMOELECTRIC MACHINE WITH AIR GAP BAFFLE ASSEMBLY INCLUDING ECCENTRIC RINGS

BACKGROUND AND SUMMARY OF THE INVENTION

This invention relates generally to dynamoelectric machines such as large turbine generators and particularly to such machines that have an air gap baffle assembly for controlled leakage of a gas coolant from the air gap.

Background reference is made to Calfo et al. U.S. Pat. No. 4,315,173, Feb. 9, 1982, which discloses a machine with an air gap baffle assembly in which the baffle ring is formed from a plurality of arcuate segments to enable access to the rotor assembly by removal of one or only a small number of segments. Also, Calfo et al. U.S. Pat. No. 4,118,645, Oct. 3, 1978, discloses a dual position air gap baffle assembly with one position used in operation of the machine and another used to provide an opening for rotor access.

Air gap baffle ring assemblies are used to regulate the flow of cooling gas through the air gap of large machines. A number of forms of baffle assemblies have been employed successfully but have required considerable maintenance, which is desirably to be minimized. Generally such baffle assemblies are secured to the stator core or stator end turns. By their inherent nature they reduce the effective air gap. One difficulty has been that the location of the air gap baffle assembly may cause it to be easily struck by the generator rotor when the rotor is installed within the stator. If that occurs, ties binding the baffle assembly to the stator end turns may be broken or stretched. Some assemblies have a neoprene rubber seal attached to the baffle ring which extends into the air gap. If the assembly is dislocated by any movement, the rubber seal may contact the rotor and be destroyed, thus losing effective control of the gas flow. More cooling gas would flow down the air gap causing other parallel gas paths to the stator windings, stator core, parallel rings, and bushings to receive less gas flow and hence the temperatures of those components would rise undesirably. Also, the debris generated by a rubbing seal is capable of damaging blower and cooler components, as well as blocking small ventilation passages in the stator windings and core.

Therefore, upon any damage to the rubber seal, its replacement was necessary. Removal of the entire air gap baffle ring assembly is generally required to replace the seal. With this type of seal it is very difficult to maintain a specified air gap, because of seal variations.

A previous improvement was made to air gap baffle assemblies that involved the use of a resin-filled hose in addition to rope ties for securing the baffle assembly on the stator winding. Such assemblies were favorable in providing slightly more space to install the rotor since the baffle ring is on a larger diameter, on the stator winding rather than the core, and also provided more support to hold the ring in position if hit by the rotor during installation. A better seal between the baffle ring and the stator windings is also provided by the resin-filled hose.

With the addition of radial vents in the core step iron, better control of the clearance between the rotor retaining ring and the air gap baffle assembly was required to maintain effective cooling. Air gap baffle assemblies were formed which contained a notch out for the rotor skid pan. The rotor skid pan is a partial cylindrical element placed over the bottom of the stator bore during installation of the rotor. The baffle assembly rotated 90° to allow the installation of the skid pan. After installing the rotor and removing the skid pan, the ring was rotated 90° and inner baffle rings with a rubber seal between them was installed. The difficulty with this system is that the rubber seal still varies and can contact the rotor. Also, the rotating assembly uses steel hardware which is heated by the high flux in the area.

The present invention avoids the need for a rubber seal ring for the ultimate definition of the clearance. This is favorable because rigid ring members define a more accurate gap. However, it remains the case that it is highly desirable to configure air gap baffle assemblies in improved ways so as to provide greater ease of installing the rotor with less likelihood of damage to the baffle assembly, whether or not a flexible seal is used. The present invention does so.

One aspect of the invention is that the baffle assembly includes a resin-filled hose on the stator winding to support the air gap baffle ring in the axial direction and to provide a seal on the outer diameter of the assembly to the stator core. The air gap baffle ring is supported on and tied to the stator winding. The air gap baffle ring is sometimes referred to herein as the "outer ring". It is the ring element furthest out from the center of the generator bore. The outer ring is machined concentric to the generator bore on its outer diameter or outer surface. However the inner surface or inner diameter of the outer ring is machined eccentric to the generator bore so that the thickest section of the ring is at the upward or 12 o'clock position while the thinnest section is at the downward or 6 o'clock position. This permits installation of the skid pan without rotation of the ring or any inner rings and also eliminates the need for metallic hardware. The rotor skid pan is then installed and the rotor is installed. After removal of the skid pan, inner rings of the air gap baffle ring assembly are installed. Each inner ring is a full circle ring with an eccentric outer diameter. and a concentric inner diameter. The eccentric offset matches the offset in the air gap baffle outer ring. Thus, the inner ring is installed with the thinnest cross-section at the 12 o'clock position and the thickest cross-section at the 6 o'clock position. The result is that the inner diameter of the inner ring determines the final gap and can be made reliably uniform.

In preferred forms of the invention, two inner rings are used, one axially in front of the other with a locking ring in between and glass bolts through in front and rear rings. In this way the inner rings are made secure while permitting their easy removal in the event of rotor removal or their reinstallation after rotor replacement. Consequently, the arrangement of an air gap baffle assembly with eccentric surfaces on the inside of an outer ring and the outside of an inner ring yields a durable baffle ring assembly and one that is suitable for easy installation and removal.

DESCRIPTION OF THE PREFERRED EMBODIMENTS

Figure 1:
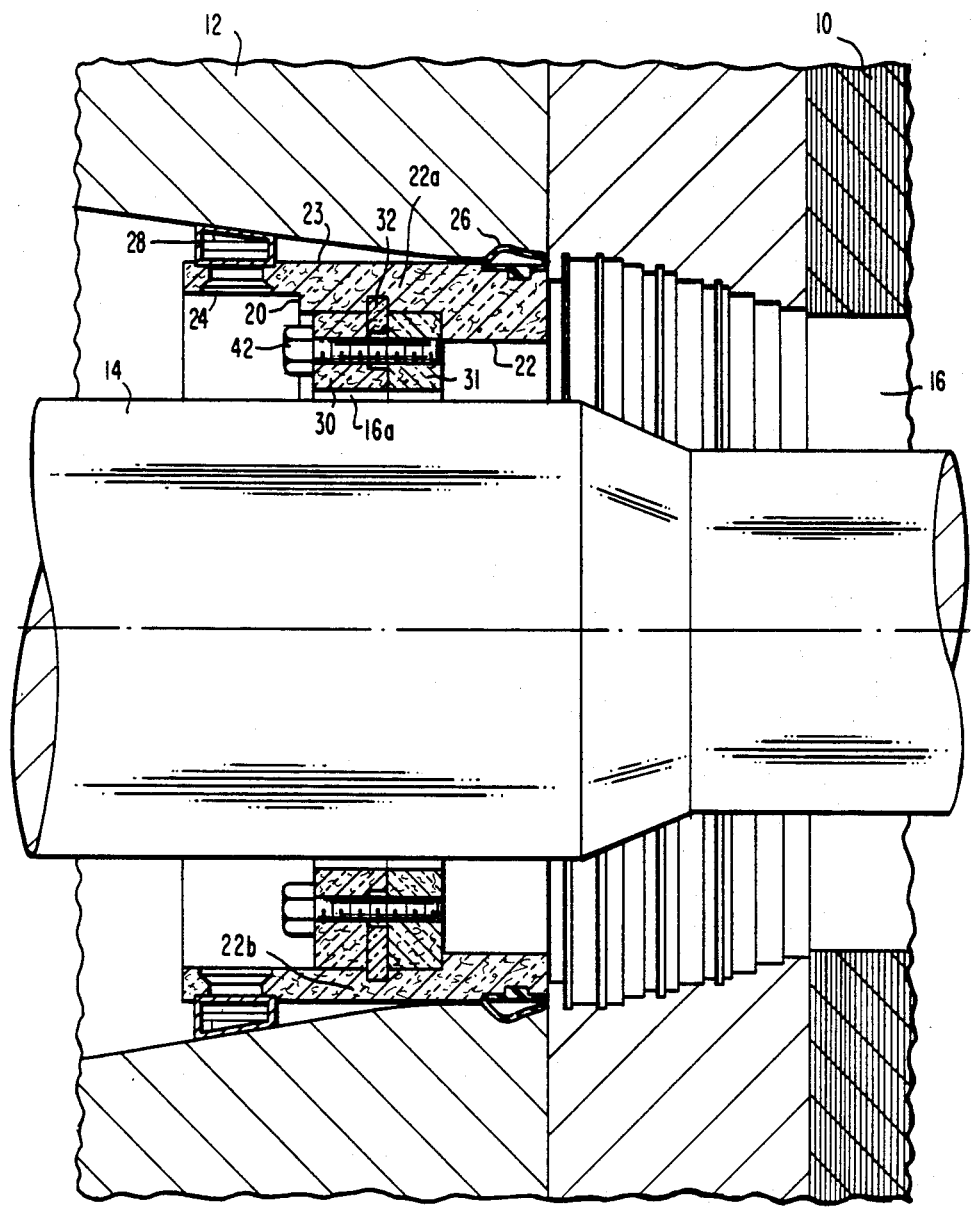
FIG. 1 is a partial sectional view of a dynamoelectric machine incorporating an embodiment of the present invention.

Referring to FIG. 1, a dynamoelectric machine such as a large turbine generator is illustrated that includes a stator core 10 with a stator winding having end turns 12 extending axially from the core in accordance with generally standard turbine generator practice. As is usual, the stator core 10 has a generally tubular configuration within which a rotor 14 is rotatably mounted and spaced from the stator by an air gap 16. The rotor has an axis 18 to which the air gap 16 is concentric.

An air gap baffle assembly 20 is fastened to the stator end turns 12 for providing a constricted gap 16a between the baffle assembly and the rotor 14 for regulating leakage of coolant gas from the air gap 16 to insure that coolant gas is adequately retained in the air gap for its cooling function. Referring to both FIGS. 1 and 2, an air gap baffle ring or outer ring 22 is used that is fastened to the stator end turns 12. The outer ring 22 has a substantially uniform cylindrical outer surface 23 and has apertures 24 for tying the ring to the stator coils. Also, a sealed tube or resin-filled hose 26 at the axially inboard end of ring 22 closes any gap between the ring and the core 10 or windings 12. A spacer ring 28 is used to fill the space between the outer ring's outer surface 23 and the adjacent stator winding at the axially outboard end of the ring.

Figure 2:
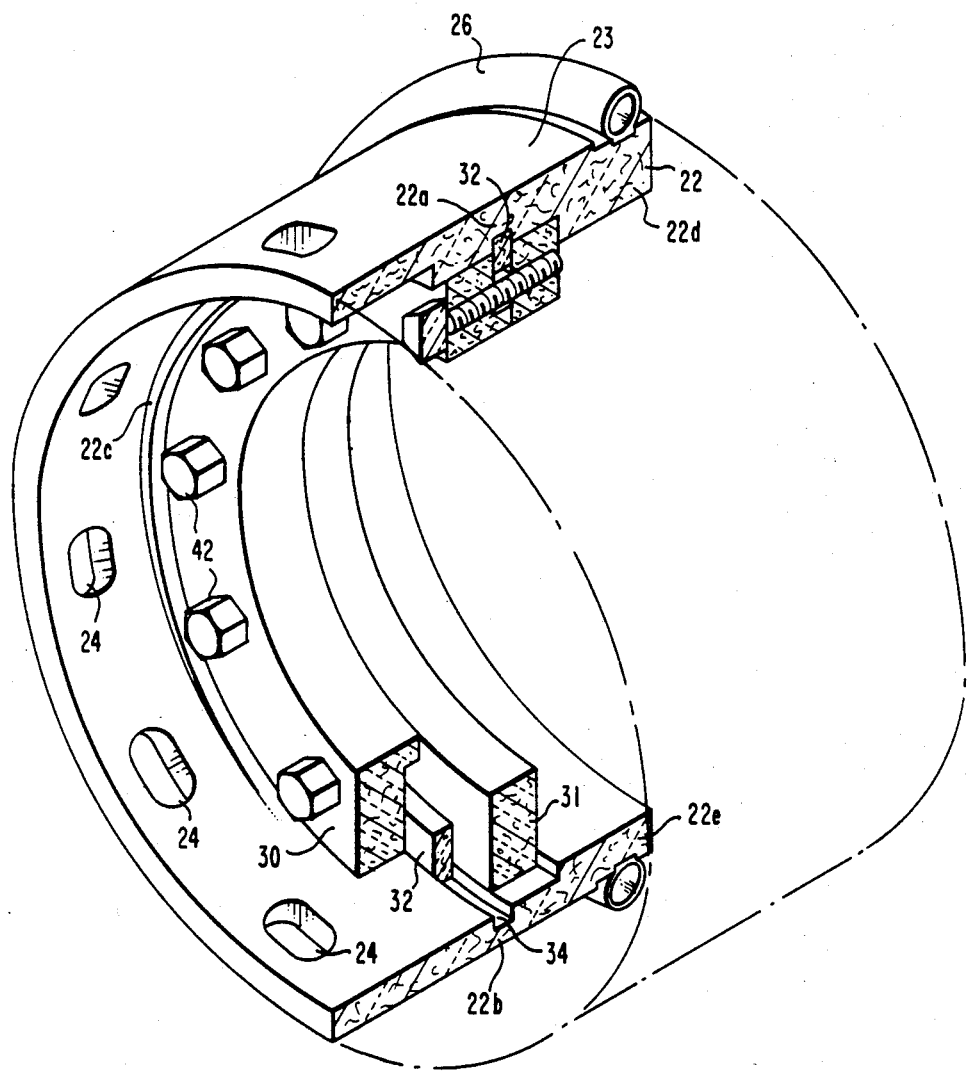
FIG. 2 is a perspective view, partially broken away, of an air gap baffle ring assembly for use in the apparatus of FIG. 1.

What particularly distinguishes the outer ring 22 from previous air gap baffle rings is that at least an axial portion of the ring has a varying radial thickness. As shown in FIGS. 1 and 2, the thickness at a vertically upward or 12 o'clock location 22a of the ring 22 is greater than that at a vertically downward or 6 o'clock position 22b. FIG. 2 shows how the inner surface of the outer ring 22 has an eccentric portion 22c that is smoothly tapered from the region 22a of greatest thickness at the top to the region 22b of least thickness at the bottom. The eccentricity of the ring is in relation to the center of the uniform outer surface 23 and axis 18.

This variation in thickness or eccentricity is mirrored by the variation in radial thickness of front and back rings 30 and 31 that are disposed on the outer ring's inner surface. The front and back rings 30 and 31 have greatest thickness at the bottom or 6 o'clock position and less thickness at the upward or 12 o'clock position. A circumferential key 32 fits in a groove 34 in the outer ring and the front and back rings are located on each side of it. The net effect of the assembly of the outer rings and inner rings is that the ultimate gap 16a between the inner rings and the rotor remains uniformly the same around the circumference. However, the eccentricity of the elements allows greater ease of installing and removing rotors from the stator than was previously available.

As seen in FIG. 1, the eccentricity of outer ring 22 occurs not only immediately radially outside the inner rings 30 and 31 but also in the axially inner part of the outer ring. In fact, the eccentricity of the latter portion may be somewhat greater than the former. For example, the following approximate dimensions are representative of those found suitable in an air gap baffle assembly at one end of a turbine generator:

| | |
|---|---|
| Outer diameter of outer ring 22 at surface 23 | 67.8 in. (172 cm) |
| Thickness of ring portion 22a which is outside the inner ring 30 and 31 at 12 o'clock position. | 1.0 in. (2.5 cm) |
| Thickness of ring portion 22b which is outside the inner rings 30 and 31 at 6 o'clock position. | 0.6 in. (1.5 cm) |
| Thickness difference between 22a and 22b. | 0.4 in. (1.0 cm) |
| Thickness of ring portion 22d which is axially inside the inner rings 30 and 31 at 12 o'clock position. | 1.5 in. (3.8 cm) |
| Thickness of ring portion 22e which is axially inside the inner rings 30 and 31 at 6 o'clock position. | 0.8 in. (2.0 cm) |
| Thickness difference between 22d and 22e. | 0.7 in. (1.8 cm) |
| Inner diameter of inner rings 30 and 31. | 62.8 in. (160 cm) |
| Gap 16a | 0.1 in. (0.3 cm) |

The thickness variation at 22d and 22e is a considerable help in allowing clearance in the lower part for rotor installation and yet the ring 22 is kept of sufficient thickness in all portions to be structurally stable. Preferably, as shown, the variation in the inner diameter of ring 22 at portions 22d and 22e is also a smooth one.

Figure 3:
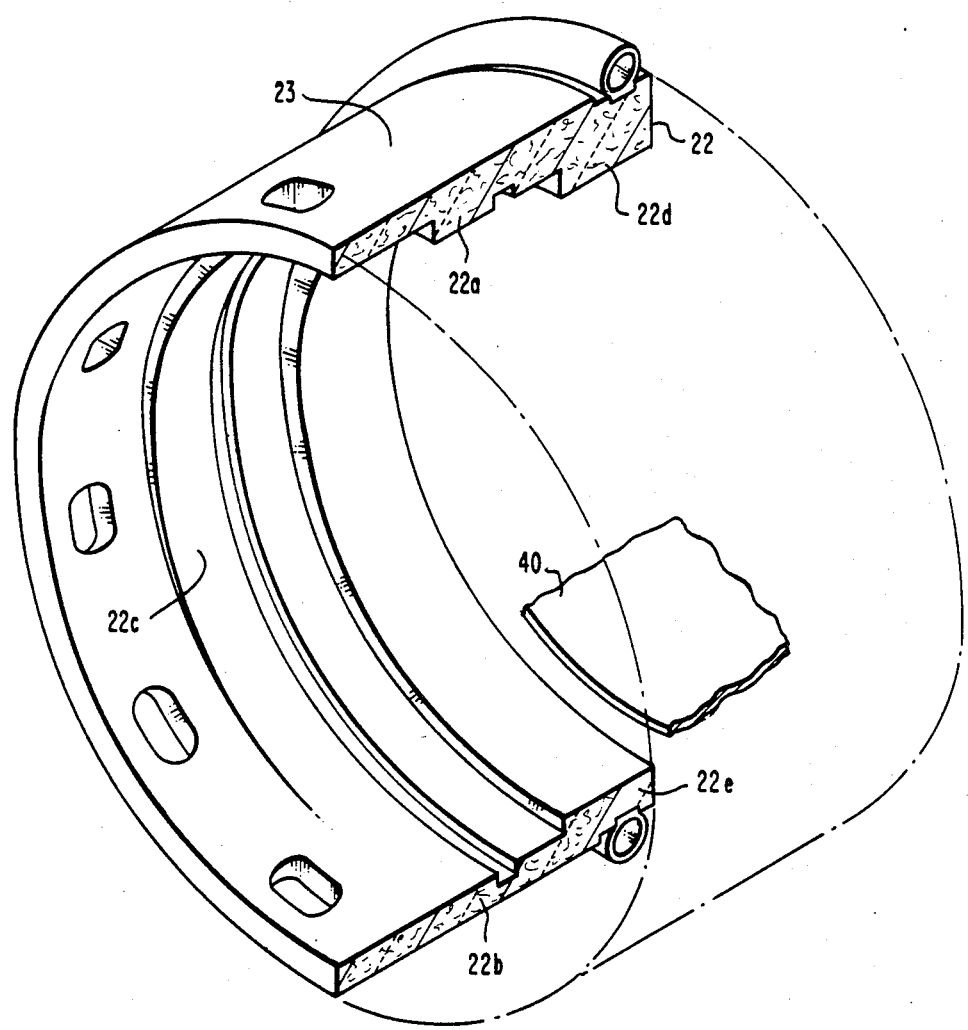
FIG. 3 is a perspective view, similar to that of FIG. 2, at a stage of assembly prior to installing the inner rings.

With the outer ring 22 in place, attached to the stator and stator winding 12, but without the inner rings being yet put in place, as shown in FIG. 3, there is more space available for the placement of a rotor skid pan 40 in the lower part of the stator bore. The rotor skid pan 40 allows installation of the rotor 14 along the axis of the machine. The present baffle assembly permits installation of the skid pan 40 without requiring rotation of any of the rings and also eliminates the need for metallic hardware. The rotor 14 is then installed. After removal of the skid pan 40, the inner back ring 31 is installed.

Next, a split locking or key ring 32 is positioned outboard of the back ring 31. This locking ring is expanded using an expansion tool applied to the ends of the ring until the locking ring is bottomed in the locking ring groove 34 machined in the air gap baffle ring 22. The tool is then removed and the front ring 30 is positioned. The front ring 30 is bolted to the back ring within the inner diameter of the locking ring 32 using threaded studs and nuts 42. The front and back inner baffle rings now serve to baffle the gas flow down the bore and hence no rubber seal is required. The required gap 16a between the rotor and air gap baffle assembly is controlled by machining the front and rear inner rings to a specified inner diameter.

Each of the rings 22, 30, 31 and 32 is suitably made of a nonmetallic material such as a glass fiber reinforced composite of which that sold under the trademark Scotchply is one example. Such a material is also preferably used for the fasteners 42. Each of the rings 22, 30 and 31 are closed over their entire 360° circumference. The locking ring 32 encompasses a full 360° but is split at one location to make it easier to install in the outer ring groove 34.

The sequence of operations performed in installation is therefore:

1. The air gap baffle ring 22 is fastened to the stator core 10 and end windings 13 with its thickest portion 22a at the top and its thinnest portion 22b at the bottom.

2. The rotor skid pan 40 is put in place.

3. The rotor 14 is installed on the skid pan and then independently supported.

4. The rotor skid pan 40 is removed.

5. The rear inner eccentric ring 31 is axially inserted in place. Its thickest portion is at the bottom and its thinnest portion at the top.

6. The key ring 32 is placed in the groove 34 in the outer ring 22.

7. The front inner eccentric ring 30 is axially inserted in place and fastened by studs and nuts 42 to the rear inner eccentric ring 31 to complete the assembly. The inner rings' 30 and 31 inner surfaces are now concentric with the rotor and provide a well defined gap 16a.

The operations may be performed in reverse sequence for removal of a rotor but without requiring removal of the outer ring 22.

In general, the invention contemplates an outer ring having at least a portion on its inner surface with the described eccentricity and a inner ring (at least one) whose outer surface has a matching reverse eccentricity. The use of two inner rings plus a locking ring, as shown, is considered favorable for making the assembly mechanically secure. It is additionally noted that if desired the rear inner ring 31 may be pinned during its assembly against the fixed outer ring, to prevent risk of in-service rotation of the final assembly that could disturb the uniformity of the final gap 16a.

The eccentricity of rings 22, 30 and 31 is presently preferred, for greater ease of machining, to be provided by smoothly tapered radiuses of the elements. However, it is also suitable where desired to have other transitions of the radiuses. For example, the upper half of the inner diameter of outer ring 22 could be on a small arc and the lower half on a larger arc with a more abrupt taper or step therebetween, with a matching, reverse, arrangement of the outer diameters of the inner rings 30 and 31. On the other hand, if no eccentricity were employed and an outer ring were simply made uniformly circular, it would have to be thinner over its entire circumference in order to provide desired rotor clearance in installation. A thinner outer ring would be more prone to distortions in assembly. Also, thicker inner rings are considered more likely to be unstable and require more complex locking arrangements to the outer ring.

Thus, it is seen that the invention provides improvement in dynamoelectric machines with air gap baffle assemblies by use of eccentric ring elements that permit greater ease of rotor installation and removal.

We claim:

1. A dynamoelectric machine comprising:
   a stator core with a stator winding thereon including end turns extending axially from said stator core, said stator core having a generally tubular configuration;
   a rotor axially and rotatably mounted within said stator core and spaced therefrom by an air gap;
   an air gap baffle assembly, for providing a limited leakage coolant gas flow from said air gap, including,
   (a) an outer ring fastened to said stator winding end turns, said outer ring having a substantially uniform cylindrical outer surface, an annular gas seal between said outer ring and said stator core, said outer ring having an inner surface that includes at least one circumferentially eccentric portion that varies from a region of greater radial thickness of said outer ring at a vertically upward location to a region of lesser radial thickness of said outer ring at a vertically downward location;
   (b) at least one inner ring fitting respectively against said at least one eccentric portion of said outer ring inner surface and having a converse eccentric configuration so that the inner diameter of said at least one inner ring is uniformly cylindrical with the result that said air gap baffle assembly provides a substantially uniform clearance from said rotor while facilitating assembly of the machine.

2. A dynamoelectric machine in accordance with claim 1 wherein:
   said at least one inner ring comprises a front inner ring and a back inner ring with a locking ring therebetween that is positioned in a circumferential groove in the inner surface of said outer ring.

3. A dynamoelectric machine in accordance with claim 2 wherein:
   said outer ring and said front and back inner rings are each continuous about its full circumference with each having smoothly graded portions to provide the referred to eccentricity of their respective surfaces.

4. A dynamoelectric machine in accordance with claim 1 wherein:
   said outer ring additionally has a second circumferentially eccentric portion that varies from a region of greater radial thickness at a vertically upward location to a region of lesser radial thickness at a vertically downward location, said second eccentric portion being axially inside said at least one inner ring.

* * * * *